US006791822B2

(12) United States Patent
Kochi et al.

(10) Patent No.: US 6,791,822 B2
(45) Date of Patent: Sep. 14, 2004

(54) SOLID ELECTROLYTIC CAPACITOR

(75) Inventors: Ayumi Kochi, Osaka (JP); Seiji Takagi, Osaka (JP); Yuji Mido, Osaka (JP); Tetsuhiro Korechika, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 75 days.

(21) Appl. No.: 10/456,403

(22) Filed: Jun. 6, 2003

(65) Prior Publication Data

US 2004/0027789 A1 Feb. 12, 2004

(30) Foreign Application Priority Data

Jun. 7, 2002 (JP) ....................................... 2002-167201
Jun. 27, 2002 (JP) ....................................... 2002-187210

(51) Int. Cl.[7] .................................................. H01G 9/00
(52) U.S. Cl. ....................... 361/523; 361/508; 361/509; 361/512; 361/525; 361/528; 29/25.03
(58) Field of Search ................................ 361/523, 528, 361/502, 503, 504, 508, 509, 516, 512, 518, 525, 529, 532; 29/25.03

(56) References Cited

U.S. PATENT DOCUMENTS 5,153,820 A * 10/1992 MacFarlane et al. ........ 361/525
5,227,960 A * 7/1993 Kunishi et al. ............. 361/502
5,587,872 A * 12/1996 Lian et al. .................. 361/525
6,459,565 B1 * 10/2002 Lessner et al. ............. 361/508
6,678,149 B2 * 1/2004 Matsumoto et al. ........ 361/523
6,680,841 B2 * 1/2004 Tadanobu et al. ........... 361/523

* cited by examiner

*Primary Examiner*—Dean A. Reichard
*Assistant Examiner*—Nguyen T. Ha
(74) *Attorney, Agent, or Firm*—RatnerPrestia

(57) ABSTRACT

A first capacitor element of a sheet form includes a porous valve metal film, a dielectric layer provided on the porous valve metal film, a solid electrolyte layer provided on the dielectric layer, and a collector layer provided on the solid electrolyte layer. A second capacitor element of a sheet form includes a valve metal film, a porous valve metal body provided on the valve metal film, a dielectric layer provided on the porous valve metal body, a solid electrolyte layer provided on the dielectric layer, and a collector layer provided on the electrolyte layer. The first and second capacitor elements are stacked. The porous valve metal film of the first capacitor element and the valve metal film of the second capacitor element are connected to one external electrode while the collector layers of the first and second capacitor elements are connected to another external electrode, thus providing a solid electrolytic capacitor. The solid electrolytic capacitor has a small size, a large capacitance, and a small ESR.

30 Claims, 12 Drawing Sheets

SOLID ELECTROLYTIC CAPACITOR

FIELD OF THE INVENTION

The present invention relates to a solid electrolytic capacitor for use in an electronic circuit in an electronic device.

BACKGROUND OF THE INVENTION

As electronic devices handles higher frequencies according to development of digital technology, a high-frequency capacitor having a small size, a large capacitance, a small internal impedance at high frequencies is demanded. To have the internal impedance reduced, a solid electrolytic capacitor are focused to have a small equivalent serial resistance (ESR) as well as a small equivalent serial inductance (ESL) at high frequencies.

FIG. 11 illustrates a conventional solid electrolytic capacitor 301. A porous valve metal film 201 is formed by etching a valve metal film made of valve metal, such as aluminum. A dielectric layer 202 is formed on the porous valve metal film 201. An insulating isolator layer 209 for separating between a lead portion of the porous valve metal film 201 and a solid electrolyte layer 206 is formed on the dielectric layer 202. The solid electrolyte layer 206 is provided on the dielectric layer 202. A carbon layer 207 is provided on the solid electrolyte layer 206, and a silver paste layer 208 is formed on the carbon layer 207, thus providing a capacitor element. The carbon layer 207 and the silver paste layer 208 functions as a collector. A desired number of such capacitor elements are stacked with silver paste. The silver paste layer 208 of each capacitor element is joined to a negative electrode lead frame 211 with the silver paste while the lead portion of the porous valve metal film 201 is joined to a positive electrode lead frame 212 by welding or the like. The stacked capacitor elements are then encapsulated by molding in a resin package 210.

FIG. 12 illustrates another conventional solid electrolytic capacitor 302. A dielectric layer 223 is formed on a porous valve metal body 222. One end of a valve metal lead 221 made of tantalum or niobium is embedded in the body 222. An insulating isolator layer 227 is provided between the valve metal lead 221 and the dielectric layer 223. A solid electrolyte layer 224 made of electrically conductive polymer is formed on the dielectric layer 223. A collector consisting of a carbon layer 225 and a silver paste layer 226 is formed on the solid electrolyte layer 224. The silver paste layer 226 is joined to a negative electrode lead frame 229 by the silver paste while the valve metal lead 221 is joined to a positive electrode lead frame 230 by welding. The stacked capacitors are then encapsulated by molding in a resin package.

The conventional solid electrolytic capacitor 301 with the positive electrode made of aluminum has an ESR smaller than that of the conventional solid electrolytic capacitor 302 with the positive electrode made of tantalum, but has a capacitance smaller than that of the capacitor 302. The conventional solid electrolytic capacitor 302 with the positive electrode made of tantalum has a large capacitance but has a large ESR.

SUMMARY OF THE INVENTION

A first capacitor element includes a porous valve metal film, a first dielectric layer provided on the porous valve metal film, a first solid electrolyte layer provided on the first dielectric layer, and a first collector layer provided on the first solid electrolyte layer.

A second capacitor element includes a valve metal film, a porous valve metal body provided on the valve metal film, a second dielectric layer provided on the porous valve metal body, a second solid electrolyte layer provided on the second dielectric layer, and a second collector layer provided on the second solid electrolyte layer.

A solid electrolytic capacitor includes a stacked-assembly including the first capacitor element and the second capacitor element stacked, a package for encapsulating the stacked-assembly, a first external electrode connected to the porous valve metal film and the valve metal film, and a second external electrode connected to the first and second collector layers. At least a portion of the first external electrode is provided on a first side of the package. At least a portion of the second external electrode is provided on a second side of the package.

The capacitor has a small size and a large capacitance while having a small equivalent serial resistance and a small equivalent serial inductance.

DETAILED DESCRIPTION OF THE PREFERRED EMBODIMENTS (Embodiment 1)

Figure 1A:
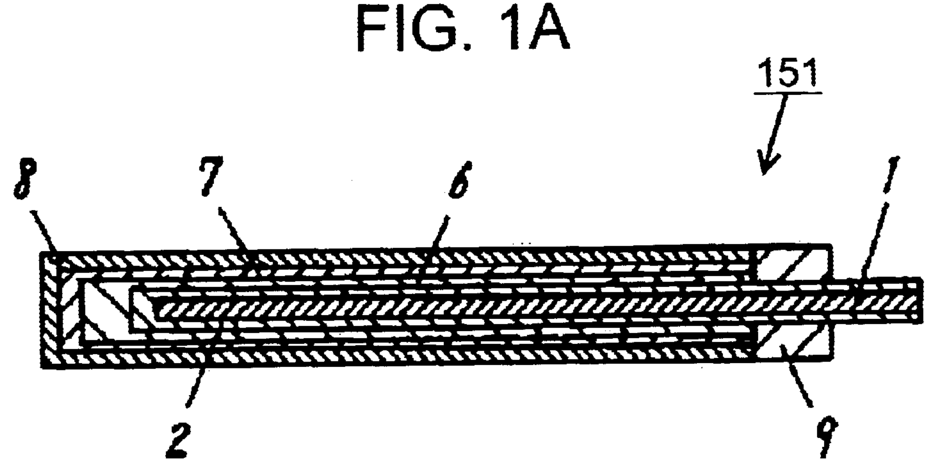
FIG. 1A is a cross sectional view of a first capacitor element in a solid electrolytic capacitor according to exemplary embodiment 1 of the present invention.
Figure 1B:
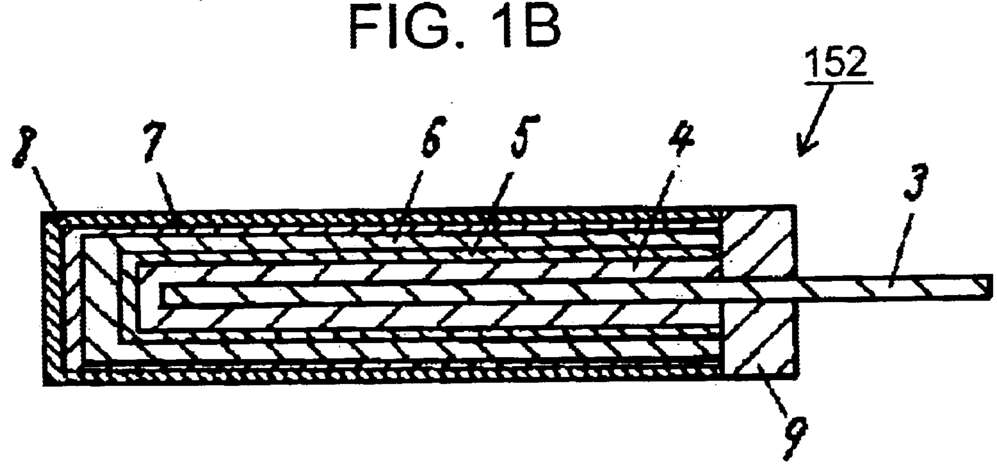
FIG. 1B is a cross sectional view of a second capacitor element in the solid electrolytic capacitor of embodiment 1.

FIG. 1A and FIG. 1B are cross sectional views of a first capacitor element 151 and a second capacitor element 152, respectively, which constitute a solid electrolytic capacitor according to exemplary embodiment 1 of the present invention.

As shown in FIG. 1A, a porous valve metal film 1 is formed by etching a valve metal film made of valve metal, such as aluminum. A dielectric layer 2 is formed on a surface of the porous valve metal film 1. An insulating isolator layer 9 is formed on the dielectric layer 2 between a solid electrolyte layer 6 and a lead portion of the porous valve metal film 1. The solid electrolyte layer 6 is formed on the dielectric layer 2. A carbon layer 7 is provided on the solid electrolyte layer 6, and a silver paste layer 8 is provided on the carbon layer 7, thus providing the first capacitor element 151. The carbon layer 7 and the silver paste layer 8 function as a collector.

As shown in FIG. 1B, a porous valve metal body 4 is formed on a valve metal film 3 made of tantalum or niobium. An insulating isolator layer 9 is provided between a lead portion of the valve metal film 3 and a side of the porous valve metal body 4 corresponding to the lead portion of the film 3. A dielectric layer 5 is formed on the porous valve metal body 4. A solid electrolyte layer 6 is formed on the dielectric layer 5. A carbon layer 7 and a silver paste layer 8 functions as a collector provided on the solid electrolyte layer 6, thus providing the second capacitor element 152.

Figure 2:
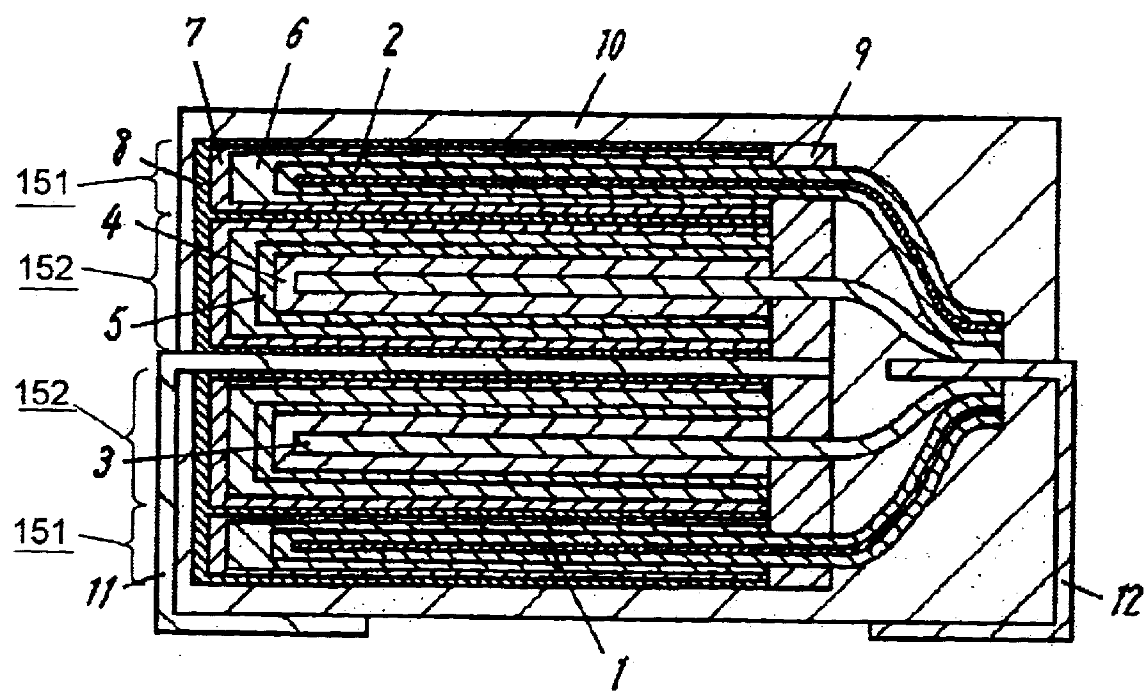
FIG. 2 is a cross sectional view of the solid electrolytic capacitor of embodiment 1.

FIG. 2 is a cross sectional view of the solid electrolytic capacitor of embodiment 1. Two of the first capacitor elements 151 and two of the second capacitor elements 152 are stacked so that the two first capacitor elements 151 are located at the outermost. A negative electrode lead frame 11 and a positive electrode lead frame 12 have respective one ends extending inward from an outer surface of an external package 10. The silver paste layer 8 of each capacitor element is joined to the negative electrode lead frame 11 by silver paste while the lead portions of the valve metal film 3 and the porous valve metal film 1 of the capacitor electrodes are joined to the positive electrode lead frame 12 by welding. The stacked elements are encapsulated in the package 10 of resin by molding. Respective exposed portions of the negative electrode lead frame 11 and the positive electrode lead frame 12 extending from the package 10 are folded down to both ends of the package 10, respectively, and are used as external electrodes.

A method of manufacturing the capacitor elements will be explained in more detail.

The dielectric layer 2 is formed by anodizing (at 8V) the porous valve metal film 1 (3×4×0.1 mm) of an etched aluminum strip in ammonium phosphate solution. The insulating isolator layer 9 is provided by applying silicone resin between the lead portion of the porous valve metal film 1 and an area of the solid electrolyte layer 6 to be formed.

The area for the solid electrolyte layer 6 on the dielectric layer 2 is immersed in mixture solution of thiophene derivative material, iron (III) p-toluenesulfonate, and butanol to develop a pre-coat layer. The pre-coat layer lightly contacts a stainless wire as a working electrode in mixture solution of thiophene derivative material, alkyl naphthalene sulfonic acid, and iso-propyl alcohol. A constant voltage of 3V is applied between the stainless wire and a stainless plate as an opposite electrode to perform an electrolytic polymerizing process for 30 minutes, thus providing the solid electrolyte layer 6.

Then, the carbon layer 7 and the silver paste layer 8 functioning as the collector are then formed on the solid electrolyte layer 6, thus providing the first capacitor element 151.

The porous valve metal body 4 (3×4×0.2 mm) is formed by sintering tantalum powder (having an average particle diameter of 0.21 $\mu$m and a nominal CV level of 100,000) provided on a surface of the tantalum valve metal film 3. The insulating isolator layer 9 is provided by applying silicone resin on the lead portion of the valve metal film 3 and an edge of the porous valve metal body 4 corresponding to the lead portion. The porous valve metal body 4 is anodized (at 12V) in phosphoric acid solution to form a tantalum oxide layer as the dielectric layer 5 on the body 4.

Then, the dielectric layer 5 is immersed in pyrrole solution containing pyrrole, water, and ethylene glycol in a ratio by weight of 1:15:1, and is then immersed in oxidizer solution containing ferric sulfate, water, and ethylene glycol in a ratio by weight of 1:1.5:1.8 to perform a chemically oxidative polymerization, thus providing a poly-pyrrole layer. Then, the poly-pyrrole layer is immersed in solution containing thiophene derivative material, iron (III) p-toluenesulfonate, and butanol in a ratio by weight of 1:0.1:0.2, thus providing the solid electrolyte layer 6 on the poly-pyrrole layer.

Then, the carbon layer 7 is formed on the solid electrolyte layer 6, and the silver paste layer 8 are formed on the layer 7 to have the collector, thus providing the second capacitor element 152.

Then, as shown in FIG. 2, two of the first capacitor elements 151 and two of the second capacitor elements 152 are stacked so that the two first capacitor elements 151 are located at the outermost. The silver paste layer 8 of each capacitor element is joined to the negative electrode lead frame 11 with silver paste, and the lead portions of the valve metal film 3 and the porous valve metal film 1 are joined to the positive electrode lead frame 12 by welding.

The stacked elements are then encapsulated in the package 10 of resin, such as epoxy resin by molding. The, an aging process is performed to the capacitor, thus providing the solid electrolytic capacitor of embodiment 1. The solid electrolytic capacitor, since having the capacitor elements of sheet form, can have a small size, a small equivalent serial resistance (ESR), and a large capacitance.

Since each first capacitor element 151 has a large linear expansion coefficient similar to that of the package 10, the package 10 is prevented from a current leakage caused by a stress during encapsulation.

In the solid electrolytic capacitor of embodiment 1, the lead frames are used as the external electrodes, thus leading electrodes from the collector easily.

In the solid electrolytic capacitor of embodiment 1, the lead frames are used as the external electrodes extending from the collector while the frames are located partially between the capacitor elements. This arrangement allows the capacitor elements to be positioned in the package.

The solid electrolytic capacitor of embodiment 1 includes the porous valve metal film of aluminum in the first capacitor element 151 formed by etching to enlarge a surface area of the metal film, hence having a large capacitance.

The solid electrolytic capacitor of embodiment 1 includes the porous valve metal body of the second capacitor element 152 made of the sintered tantalum or niobium powder, hence having a large capacitance.

The solid electrolytic capacitor of embodiment 1 includes the solid electrolyte layers of the capacitor elements made of electrically conductive polymer, thus having a small ESR.

The solid electrolytic capacitor of embodiment 1 includes the stacked capacitor elements encapsulated in the package 10 and the external electrodes provided on both sides of the package 10 opposite to each other. This arrangement allows the capacitor to be mounted easily.

(Embodiment 2)

Figure 3:
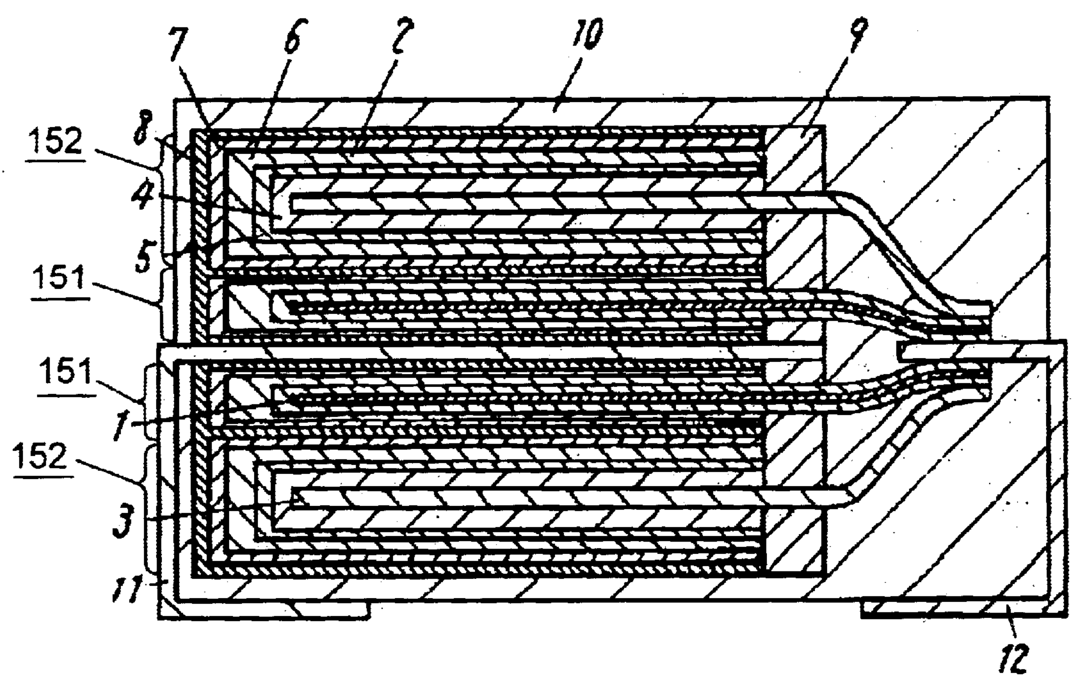
FIG. 3 is a cross sectional view of a solid electrolytic capacitor according to exemplary embodiment 2 of the invention.

FIG. 3 is a cross sectional view of a solid electrolytic capacitor according to exemplary embodiment 2 of the present invention. First capacitor elements 151 and second capacitor elements 152 are fabricated similarly to embodiment 1. Two of the first capacitor elements 151 and two of the second capacitor elements 152 are stacked by the same method as that of embodiment 1, so that the two second capacitor elements 152 are located at the outermost. Then, the solid electrolytic capacitor of embodiment 2 is fabricated similarly to embodiment 1.

Since the second capacitor element 152 has a physical strength larger than the first capacitor element 152, the solid electrolytic capacitor of embodiment 2 can be handled easily for shipment.

(Embodiment 3)

Figure 4:
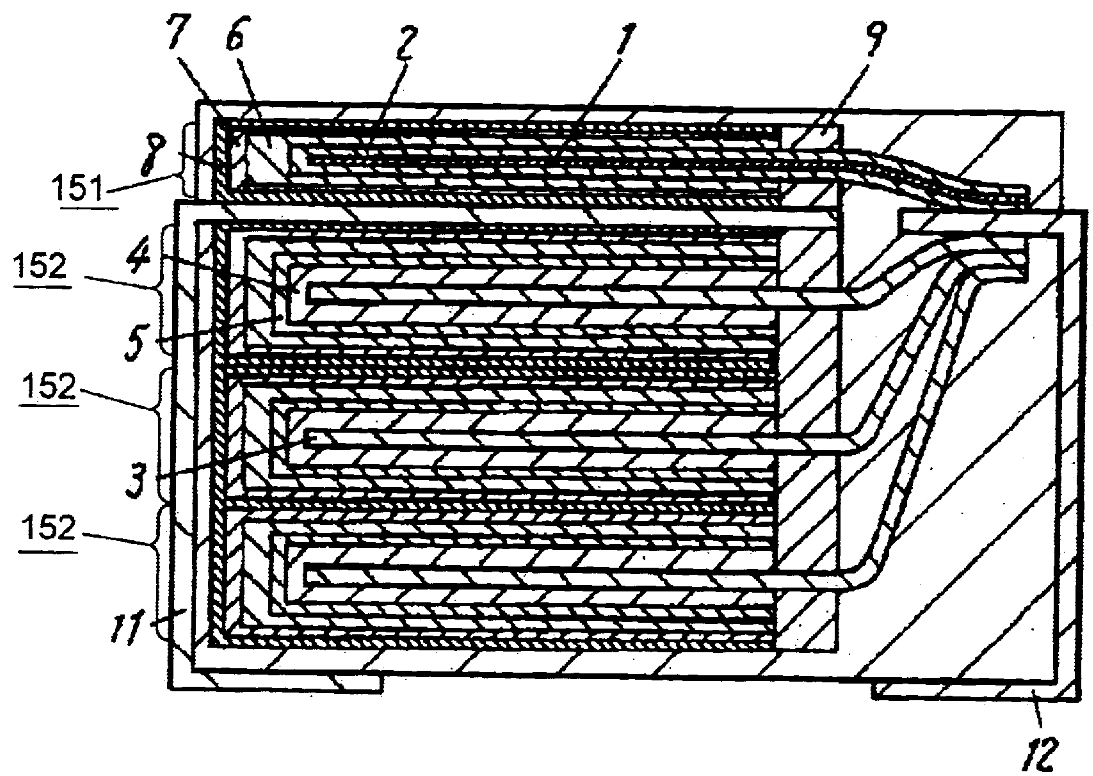
FIG. 4 is a cross sectional view of a solid electrolytic capacitor according to exemplary embodiment 3 of the invention.

FIG. 4 is a cross sectional view of a solid electrolytic capacitor according to exemplary embodiment 3 of the present invention. First capacitor elements 151 and second capacitor elements 152 are fabricated similarly to embodiment 1. Then, a stacked assembly including only the first capacitor elements 151 and a stacked assembly including only the second capacitor elements 152 are stacked. Then, the solid electrolytic capacitor of embodiment 3 is provided similarly to embodiment 1.

Since including the capacitor elements of each type stacked, the solid electrolytic capacitor of embodiment 3 has its capacitance and ESR arbitrarily designed.

Most of the capacitor elements the solid electrolytic capacitor of embodiment 3 may be the second capacitor elements 152, and the rest of the capacitor elements of the capacitor may be the first capacitor elements 151, at least one capacitor element 151. This arrangement allows the capacitor to have a large capacitance and small size, while allowing the capacitor to be inexpensive.

(Embodiment 4)

Figure 5:
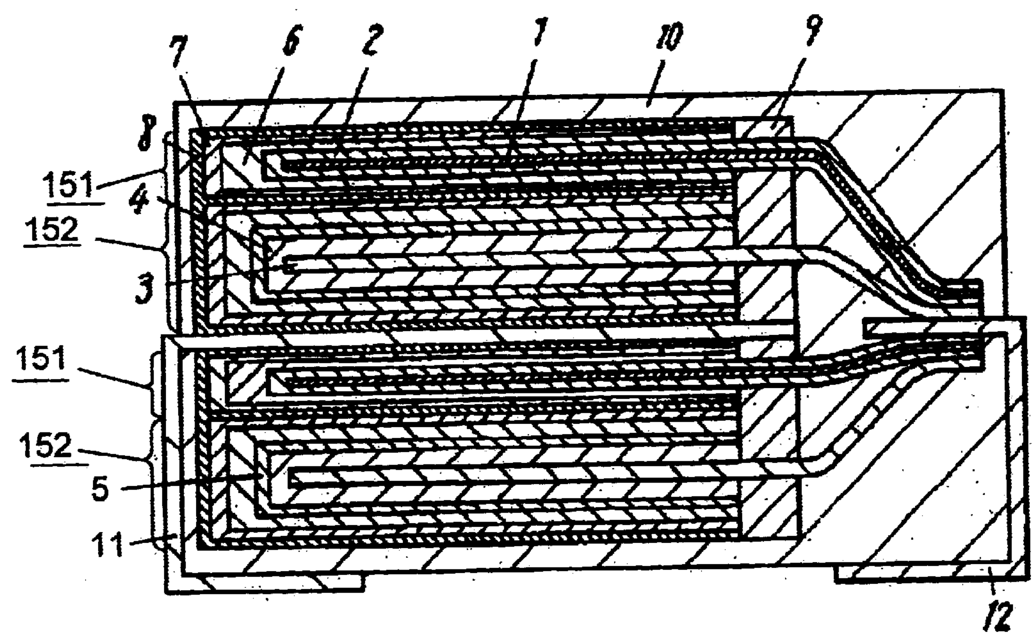
FIG. 5 is a cross sectional view of a solid electrolytic capacitor according to exemplary embodiment 4 of the invention.

FIG. 5 is a cross sectional view of a solid electrolytic capacitor according to exemplary embodiment 4 of the present invention. First capacitor elements 151 and second capacitor elements 152 are fabricated similarly to embodiment 1. Then, stacked assemblies each including a single first capacitor element 151 and a single second capacitor element 152 are stacked. Then, similarly to embodiment 1, the solid electrolytic capacitor of embodiment 4 is provided.

Since the stacked assemblies each including the first capacitor element 151 and the second capacitor element 152 are stacked as units, the solid electrolytic capacitor of embodiment 4 can be fabricated at high productivity.

COMPARATIVE EXAMPLE 1

Figure 11:
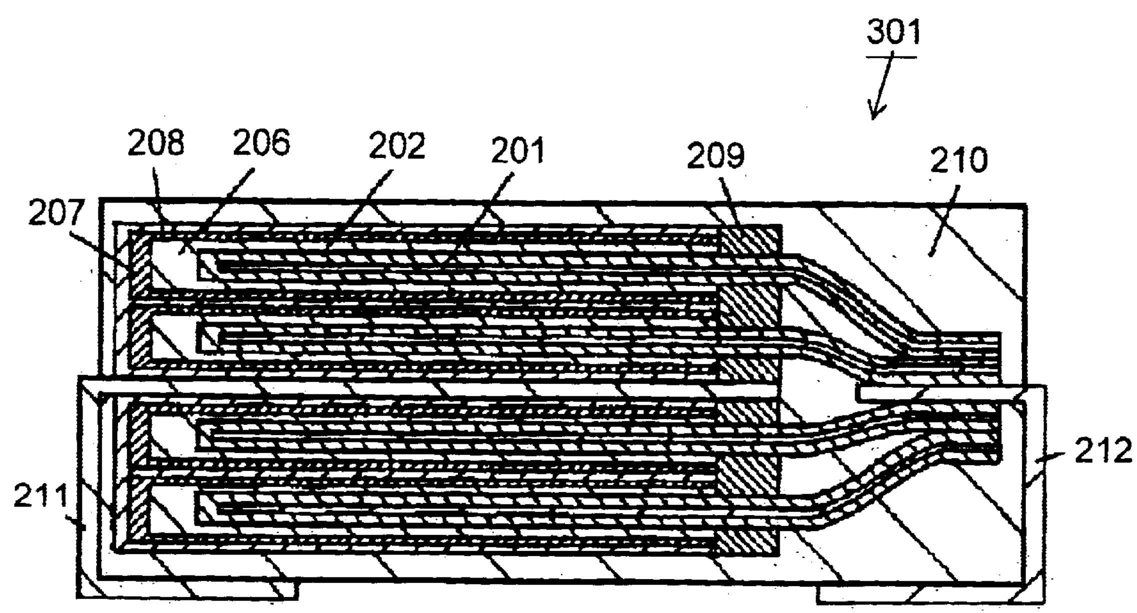
FIG. 11 is a cross sectional view of a conventional solid electrolytic capacitor.

A solid electrolytic capacitor of comparative example 1 was fabricated with four of the first capacitor elements 151 of embodiment 1 similarly to embodiment 1. This capacitor corresponds to the conventional solid electrolytic capacitor shown in FIG. 11.

COMPARATIVE EXAMPLE 2

Figure 12:
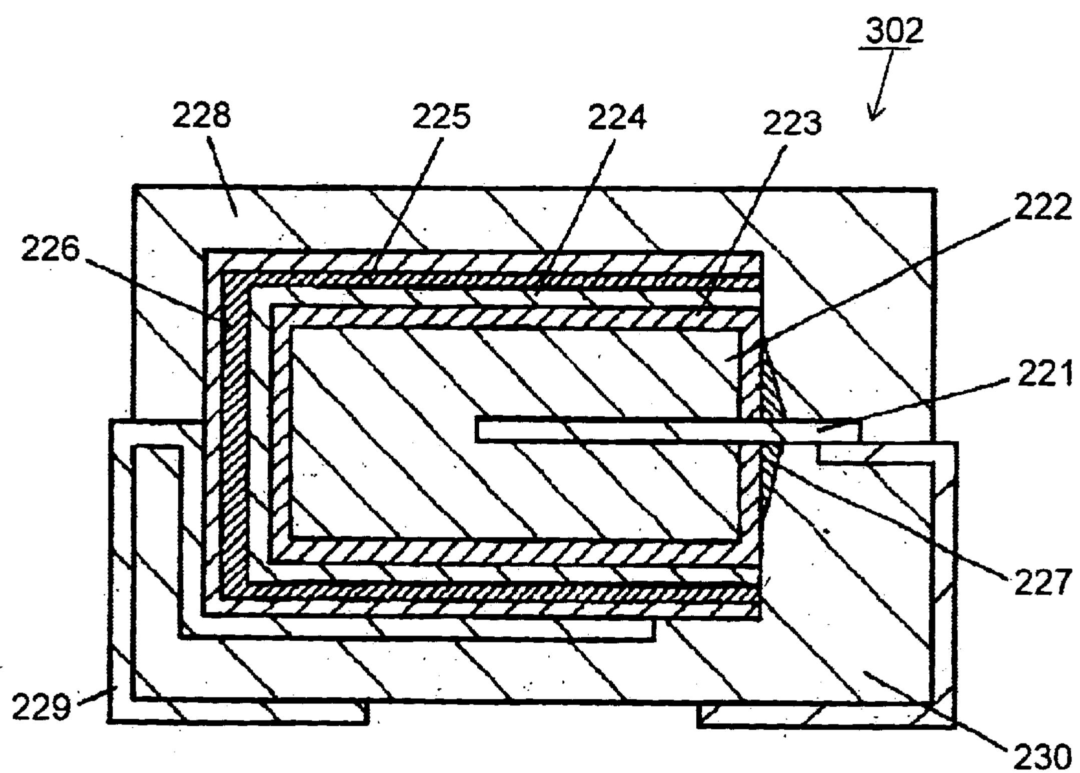
FIG. 12 is a cross sectional view of another conventional solid electrolytic capacitor.

A solid electrolytic capacitor of comparative example 2 was fabricated similarly to embodiment 1. However, the valve metal film 3 of each second capacitor element 152 of embodiment 1 was replaced by a porous valve metal body 22 (3×4×1 mm) having a valve metal lead wire 21 embedded in the body 22 of a conventional tantalum solid electrolytic capacitor. Then capacitor of comparative example 2 is fabricated similarly to embodiment 2. The capacitor of comparative example 2 corresponds to to the conventional solid electrolytic capacitor shown in FIG. 12.

Table 1 illustrates initial characteristics of the first capacitor element 151 (Al) and the second capacitor element 152 (Ta) of embodiment 1, the solid electrolytic capacitors of embodiments 1 to 4, and the solid electrolytic capacitors of comparative examples 1 and 2.

TABLE 1

| | After Molding | | | Height of |
|---|---|---|---|---|
| | Capacitance @120 Hz ($\mu$F) | Leak Current @4 V After 30 sec. ($\mu$A) | ESR @100 kHz (m$\Omega$) | Capacitance Element before Molding (mm) |
| First Capacitance Element (Al) | 17 | 0.49 | 18 | 0.196 |
| Second Capacitance Element (Ta) | 90 | 1.1 | 20 | 0.289 |
| Embodiment 1 | 216 | 6.4 | 7 | 1.01 |
| Embodiment 2 | 215 | 14.2 | 7 | 1.08 |
| Embodiment 3 | 289 | 11.9 | 7 | 1.15 |
| Embodiment 4 | 218 | 18.6 | 8 | 0.98 |
| Comparative Example 1 | 65 | 2.2 | 7 | 0.78 |
| Comparative Example 2 | 478 | 42.1 | 35 | 1.1 |

According to the initial characteristics shown in Table 1, the solid electrolytic capacitors of embodiments 1 to 4 has small ESRs, small sizes, large capacitances. However, the solid electrolytic capacitor of comparative example 1 including the same number of the capacitor elements as those in the capacitors of embodiments 1 to 4 has a capacitance much smaller than the capacitors of the embodiments while having an ESR substantially identical to the ESRs of the capacitors of the embodiments. The solid electrolytic capacitor of comparative example 2 having the same size before an encapsulating process to sizes of the capacitors of embodiments 1 to 4 has an ESR much larger than the capacitors of the embodiments.

(Embodiment 5)

Figure 6:
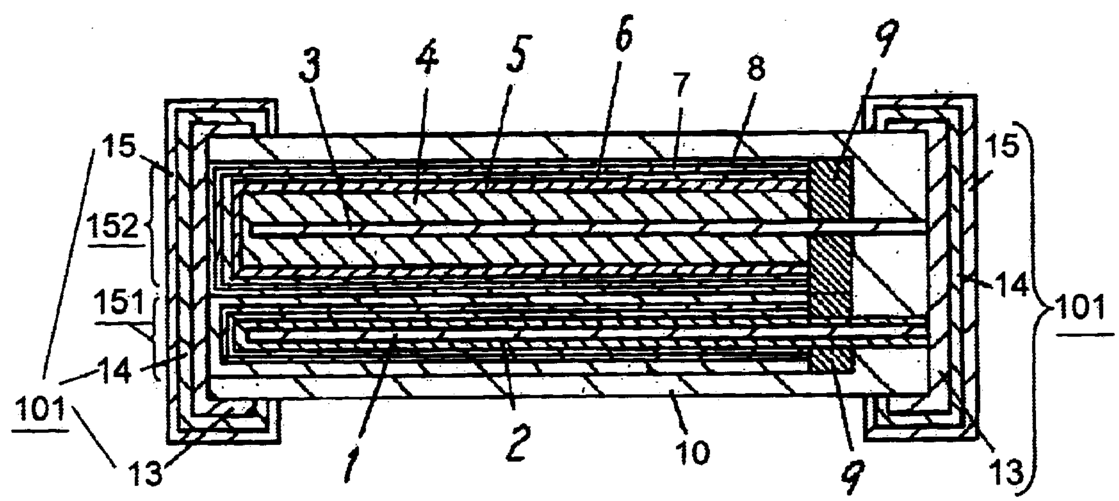
FIG. 6 is a cross sectional view of a solid electrolytic capacitor according to exemplary embodiment 5 of the invention.

FIG. 6 is a cross sectional view of a solid electrolytic capacitor according to exemplary embodiment 5 of the present invention. A first capacitor element 151 and a second capacitor element 152 are fabricated similarly to embodiment 1. The first capacitor element 151 and the second capacitor element 152 are stacked, and a porous valve metal film 1 and a valve metal film 3 have valve metals exposed at a positive electrode end to one side of a package 10. Silver paste layers 8 at a negative electrode end of the capacitor elements are joined to each other with silver paste and are exposed at the negative electrode end to the opposite side of the package 10. The package 10 is formed by molding the elements with resin material, such as epoxy resin, epoxy silicone resin, or phenol epoxy resin.

Each external electrode 101 consists mainly of a first conductive layer 13, a second conductive layer 14, and a third conductive layer 15 stacked. The first conductive layer 13 is directly metal-bonded to the valve metal with no interface of a valve metal oxide layer since containing one metal selected from Cu, Ag, and Au capable of being plated for metal bonding with the valve metal. The metal, such as Cu, Ag, and Au has a standard electrode potential nobler than the valve metal. When the solid electrolytic capacitor having the porous valve metal film 1 and the valve metal film 3 exposed to one side of the package 10 is immersed in acid solution, such as sulfuric acid containing the specific metal, film oxides on surfaces of the porous valve metal film 1 and the valve metal film 3 are dissolved with the acid and are replaced by the specific metal. This reaction allows the external electrode 101 and the valve metal films to be joined by metal bonding.

The second conductive layer 14 made of metal, such as nickel, is provided for protecting the first conductive layer 13 from being corroded by soldering material.

The third conductive layer 15 having an affinity for soldering material, such as tin, is provided on the second conductive layer 14, thus permitting the external electrodes 101 to have a small resistance.

The solid electrolytic capacitor of embodiment 5 includes an assembly of the stacked capacitor elements. More particularly, a capacitor of example 5 includes the single first capacitor element 151 and the single second capacitor element 152 stacked. A capacitor of example 6 includes the first capacitor element 151 and two of the second capacitor elements 152. A solid electrolytic capacitor of example 7 includes the first capacitor element 151 and three of the second capacitor elements 152.

In the solid electrolytic capacitor of embodiment 5, the distance between electrodes is shorter than a capacitor including a lead frame. Thus, the capacitor of embodiment 5 can have a small ESR and a small equivalent serial inductance (ESL) while having the capacitor elements to have large volume, thus having a capacitance per unit volume.

The solid electrolytic capacitor of embodiment 5 includes external electrodes 101 formed by plating, thus having a small resistance and an improved operational reliability and productivity.

COMPARATIVE EXAMPLE 3

A second capacitor element 152 (Ta) was fabricated similarly to embodiment 1, is encapsulated by molding with epoxy resin, and then provided with external electrodes formed by plating on the outer surface of a package. After an aging process, a solid electrolytic capacitor of comparative example 3 was completed.

COMPARATIVE EXAMPLE 4

Two second capacitor elements 152 (Ta) were fabricated similarly to embodiment 1, are stacked with silver paste, are encapsulated by molding with epoxy resin, and then provided with external electrodes formed by plating on the outer surface of a package. After an aging process, a solid electrolytic capacitor of comparative example 4 was completed.

COMPARATIVE EXAMPLE 5

Three second capacitor elements 152 (Ta) were fabricated similarly to embodiment 1, are stacked with silver paste, are encapsulated by molding with epoxy resin, and provided with external electrodes formed by plating on the outer surface of a package. After an aging process, a solid electrolytic capacitor of comparative example 5 was completed.

COMPARATIVE EXAMPLE 6

A first capacitor element 151 (Al) was fabricated similarly to embodiment 1, is joined to lead frames, and is then capsulated with epoxy resin. After an aging process, a solid electrolytic capacitor of comparative example 6 was completed.

COMPARATIVE EXAMPLE 7

Three first capacitor element 151 (Al) were fabricated similarly to embodiment 1, are stacked with silver paste, are joined to lead frames, and are then encapsulated with epoxy resin. After an aging process, a solid electrolytic capacitor of comparative example 7 was completed.

(Embodiment 6)

Figure 7:
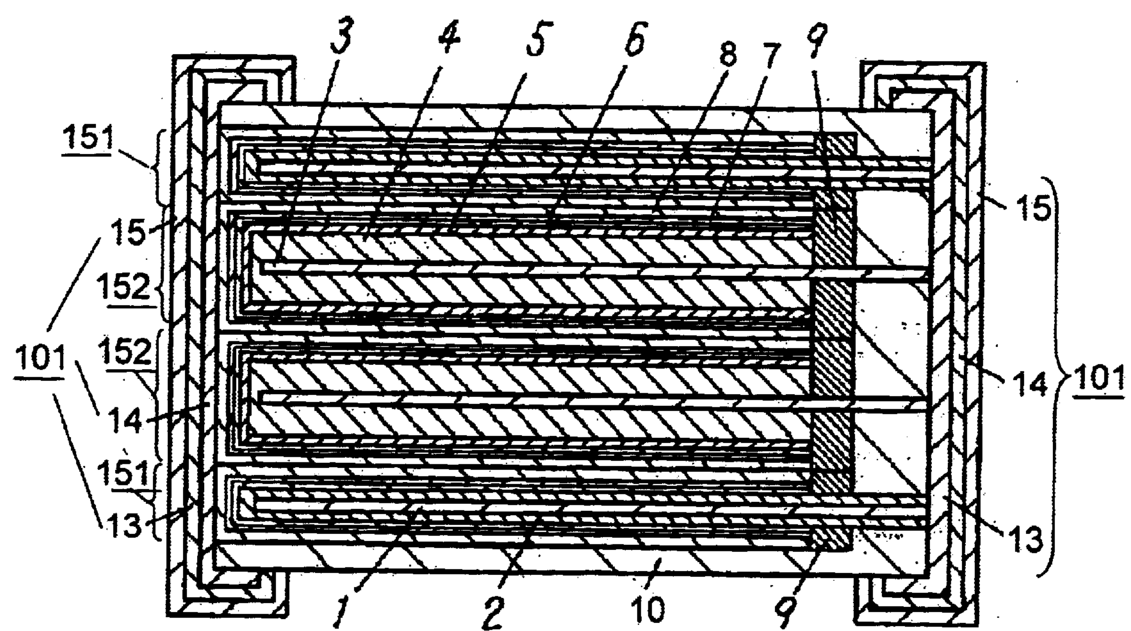
FIG. 7 is a cross sectional view of a solid electrolytic capacitor according to exemplary embodiment 6 of the invention.

FIG. 7 is a cross sectional view of a solid electrolytic capacitor according to exemplary embodiment 6 of the present invention. First capacitor elements 151 and second capacitor elements 152 are fabricated similarly to embodiment 1. Two of the first capacitor elements 151 and two of the second capacitor elements 152 are stacked with silver paste so that the first capacitor elements 151 are located at the outermost as shown in FIG. 7. Respective lead portions of porous valve metal films 1 and valve metal films 3 are drawn out as positive electrodes from the stacked elements and exposed to one side of a package 10.

Silver paste layers 8 at negative electrode ends of the capacitor elements are joined to each other with silver paste and are exposed at the opposite side of the package 10. Similarly to embodiment 5, the lead portions of the porous valve metal film 1 and the valve metal film 3 exposed from the package 10 are directly joined to the first conductive layer 13 of a positive external electrode 101. The exposed portion of the silver paste layers 8 on the package 10 is directly joined to the first conductive layer 13 of a negative external electrode 101. A second conductive layer 14 is located on the first conductive layer 13, and a third conductive layer 15 is provided on the second conductive layer 14, thus providing the solid electrolytic capacitor as a surface-mount type component. Initial characteristics of the solid electrolytic capacitor of this embodiment are shown as a capacitor of example 8 in Table 2. The solid electrolytic capacitor of example 8 includes two of the first capacitor elements 151 and two of the second capacitor elements 152 stacked.

The solid electrolytic capacitor of example 8 according to embodiment 6 has a small ESR, a small ESL, and a large capacitance.

(Embodiment 7)

Figure 8:
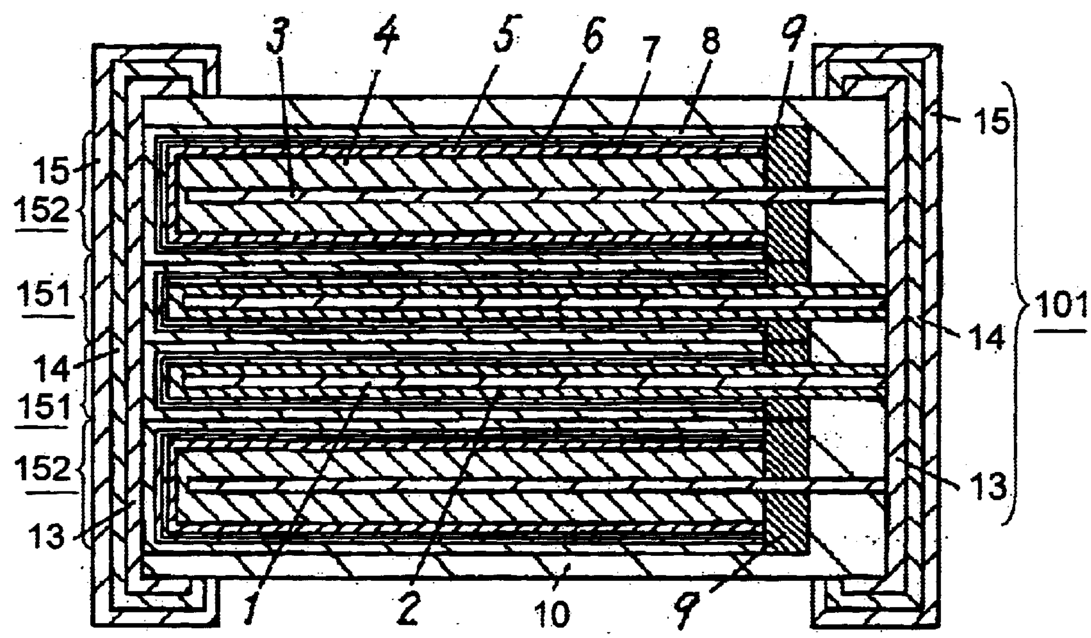
FIG. 8 is a cross sectional view of a solid electrolytic capacitor according to exemplary embodiment 7 of the invention.

FIG. 8 is a cross sectional view of a solid electrolytic capacitor according to exemplary embodiment 7 of the present invention. First capacitor elements 151 and second capacitor elements 152 are fabricated similarly to embodiment 1. Two of the first capacitor elements 151 and two of the second capacitor elements 152 are stacked so that the second capacitor elements 152 are located at the outermost. The solid electrolytic capacitance of embodiment 7 is completed similarly to embodiment 6. Initial characteristics of the solid electrolytic capacitance of embodiment 7 are shown as a capacitor of example 9 in Table 2.

The solid electrolytic capacitance of embodiment 7 includes the capacitor elements having sheet forms and can thus have s small size while having a small ESR and a large capacitance.

Table 2 illustrates capacitances at 120 Hz, ESRs at 100 kHz, the heights (H1) before the encapsulation, and the heights (H2) after the encapsulation for the solid electrolytic capacitors of examples 5 to 7 and comparative example 3 to 7. Each measurement shown in Table 2 represents an average of measurements for the ten capacitors of each type.

TABLE 2

| | Number of Capacitor Elements | | | Capa-Citance | ESR | ESL | H1 | H2 |
|---|---|---|---|---|---|---|---|---|
| | Al | Ta | Total | (μF) | (mΩ) | (nH) | (mm) | (mm) |
| Example 5 | 1 | 1 | 2 | 107 | 11 | 4.15 | 0.48 | 1.2 |
| Comparative Example 3 | 0 | 1 | 1 | 90 | 20 | 4.17 | 0.30 | 1.2 |
| Example 6 | 1 | 2 | 3 | 197 | 7 | 3.63 | 0.78 | 1.6 |
| Comparative Example 4 | 0 | 2 | 2 | 180 | 12 | 4.14 | 0.62 | 1.6 |
| Example 7 | 1 | 3 | 4 | 287 | 5 | 3.52 | 1.14 | 1.9 |
| Comparative Example 5 | 0 | 3 | 3 | 270 | 7 | 4.13 | 1.05 | 1.9 |
| Comparative Example 6 | 1 | 0 | 1 | 17 | 19 | 7.06 | 0.20 | 0.9 |
| Comparative Example 7 | 3 | 0 | 3 | 51 | 5 | 7.04 | 0.59 | 1.2 |
| Example 8 | 2 | 2 | 4 | 214 | 5 | 3.12 | 1.0 | 1.9 |
| Example 9 | 2 | 2 | 4 | 214 | 5 | 3.13 | 1.0 | 1.9 |

As shown in Table 2, the solid electrolytic capacitors of examples 5 to 9 have smaller sizes, larger capacitances, smaller ESRs, and smaller ESLs than capacitors of comparative examples 3 to 7 with the height remaining unchanged. The capacitors of the comparative examples include the aluminum capacitor elements having small sizes and small ESRs, but have large ESLs due to the lead frames.

The tantalum capacitor elements having the large capacitances and the aluminum capacitor elements having a moderate capacitances and small thicknesses are stacked. Therefore, the solid electrolytic capacitor has the small ESR and the large capacitance while having an unchanged height. The solid electrolytic capacitor, since including no lead frames, has the small ESL.

(Embodiment 8)

Figure 9:
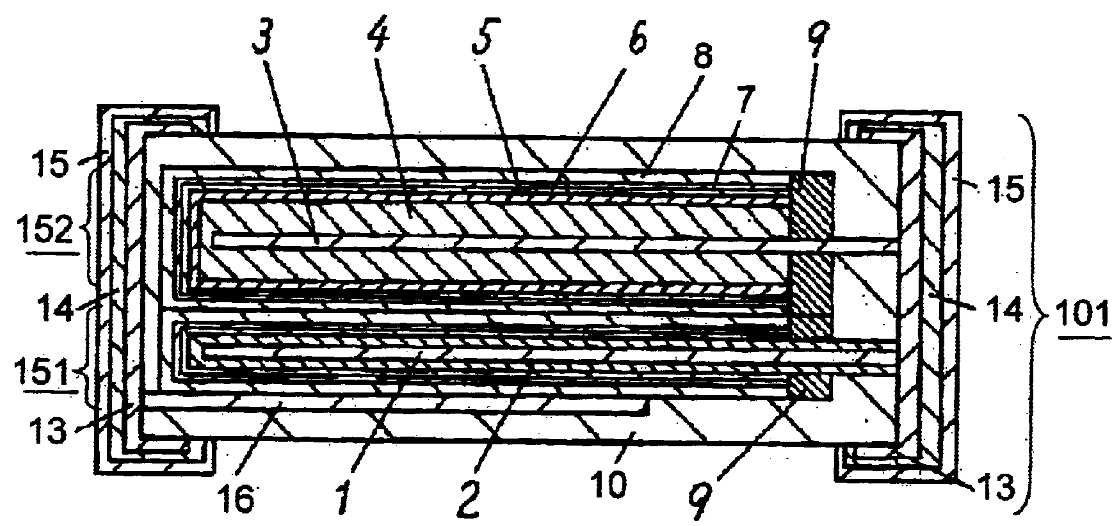
FIG. 9 is a cross sectional view of a solid electrolytic capacitor according to exemplary embodiment 8 of the invention.

FIG. 9 is a cross sectional view of a solid electrolytic capacitor according to exemplary embodiment 8 of the present invention. A first capacitor element 151 and a second capacitor element 152 of this embodiment are fabricated similarly to embodiment 1.

The solid electrolytic capacitor of embodiment 8 shown in FIG. 9, differently from that of embodiment, silver paste layers 8 are electrically connected to the first conductive layer 13 of a negative external electrode 101 with a lead electrode 16. The lead electrode 16 is made of small-resistance material, such as silver, gold, nickel, copper, aluminum, or their alloy. Since the lead electrode 16 has a small resistance and has an affinity for plating, the solid electrolytic capacitor can have a small ESR.

The electrical characteristics of this embodiment are substantially similar to those of the capacitor shown in FIG. 6. The lead electrode 16 is arranged of a lead frame. This structure allows the capacitor elements to be carried on the frame during its production, thus increasing a productivity of the solid electrolytic capacitor.

The lead electrode of the solid electrolytic capacitor of embodiment 8 is made of metal which can be base for the plating, thus being joined to an external electrode easily.

(Embodiment 9)

Figure 10:
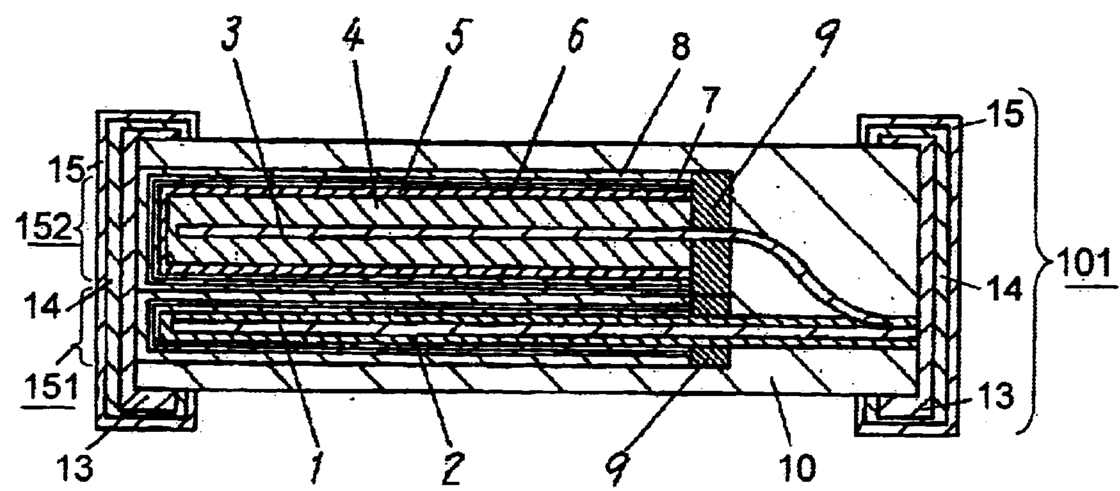
FIG. 10 is a cross sectional view of a solid electrolytic capacitor according to exemplary embodiment 9 of the invention.

FIG. 10 is a cross sectional view of a solid electrolytic capacitor according to exemplary embodiment 9 of the present invention. A first capacitor element 151 and a second capacitor element 152 of this embodiment are fabricated similarly to embodiment 1.

The solid electrolytic capacitor of embodiment 9 shown in FIG. 10, differently from that of embodiment 1, a porous valve metal film 1 in the first capacitor element 151 is joined at one end of the element 151 to a valve metal film 3 in the second capacitor element 152 by mutual locking or welding in the package 10 while the other end of the porous valve metal film 1 is exposed to one side of the package 10.

This arrangement allows the valve metal film 3 made of hardly-plating metal, such as tantalum or niobium, to be joined easily to the porous valve metal film 1 which is made of easily-plating aluminum and is joined by plating to the first conductive layer 13 of a positive external electrode 101. Accordingly, the solid electrolytic capacitor of this embodiment can be manufactured reliably.

According to embodiments 1 to 9, the solid electrolyte layers 6 is formed by chemical polymerization. The solid electrolyte layers 6 may be formed by performing electrolytic polymerization to a pre-coat layer made of manganese dioxide or to a solid electrolyte layer formed by chemical polymerization. The material of the solid electrolyte layers formed by a chemical polymerization method or an electrolytic polymerization method is not limited to this but may preferably be pyrrole, thiophene, aniline, or their derivative chained material for easy polymerization. The material may be any combination of poly-pyrrole, poly-aniline, poly-thiophene, and derivative material of them.

While the porous valve metal body 4 is provided on both sides of the valve metal film 3 according to embodiment 1 to 9, the body 4 may be provided on one side of the valve metal film 3.

What is claimed is:

1. A solid electrolytic capacitor comprising:

at least one first capacitor element including a porous valve metal film, a first dielectric layer provided on said porous valve metal film, a first solid electrolyte layer provided on said first dielectric layer, and a first collector layer provided on said first solid electrolyte layer;

at least one second capacitor element stacked over said at least one first capacitor element, said at least one second capacitor element including a valve metal film, a porous valve metal body provided on said valve metal film, a second dielectric layer provided on said porous valve metal body, a second solid electrolyte layer provided on said second dielectric layer, and a second collector layer provided on said second solid electrolyte layer;

a stacked-assembly including said at least one first capacitor element and said at least one second capacitor element;

a package for encapsulating said stacked-assembly;

a first external electrode connected to said porous valve metal film and said valve metal film, at least a portion of said first external electrode being provided on a first side of said package; and a second external electrode connected to said first and second collector layers, at least a portion of said second external electrode being provided on a second side of said package.

2. The solid electrolytic capacitor according to claim 1, wherein a portion of said porous valve metal film and a portion of said valve metal film are exposed at said first side of said package, wherein respective portions said first and second collector layers are exposed at said second side of said package, wherein said first external electrode is connected to said portion of said porous valve metal film and said portion of said valve metal film, and wherein said second external electrode is connected to said respective portions of said first and second collector layers.

3. The solid electrolytic capacitor according to claim 1, further comprising a lead electrode connected to said first and second collector layers, a portion of said lead electrode being exposed at said second side of said package, wherein a portion of said porous valve metal film and a portion of said valve metal film are exposed at said first side of said package, wherein said first external electrode is connected to said portion of said porous valve metal film and said portion of said valve metal film, and wherein said second external electrode is connected to said portion of said lead electrode.

4. The solid electrolytic capacitor according to claim 3, wherein said second external electrode is formed by plating.

5. The solid electrolytic capacitor according to claim 4, wherein said lead electrode contains metal which can be base for plating of said second external electrode.

6. The solid electrolytic capacitor according to claim 3, wherein said lead electrode contains at least one of silver, gold, nickel, copper, and aluminum.

7. The solid electrolytic capacitor according to claim 1, wherein said first external electrode includes a first lead frame having a portion embedded in said package from an outer surface of said package.

8. The solid electrolytic capacitor according to claim 1, wherein said second external electrode includes a second lead frame having a portion embedded in said package from an outer surface of said package.

9. The solid electrolytic capacitor according to claim 8, wherein said portion of said second lead frame is located between two of said at least one first capacitor element and said at least one second capacitor element.

10. The solid electrolytic capacitor according to claim 1, wherein at least one of said first and second, external electrodes is formed by plating.

11. The solid electrolytic capacitor according to claim 1, wherein said porous valve metal film has an end thereof connected to said valve metal film inside an outer surface of said package.

12. The solid electrolytic capacitor according to claim 1, wherein said first external electrode includes a first conductive layer containing copper and connected to said porous valve metal film and said valve metal film, a second conductive layer containing nickel and provided on said first conductive layer, and a third conductive layer containing tin or solder and provided on said second conductive layer.

13. The solid electrolytic capacitor according to claim 1, wherein said second external electrode includes a first conductive layer containing copper and connected to said first and second collector layers, a second conductive layer containing nickel and provided on said first conductive layer, and a third conductive layer containing tin or solder and provided on said second conductive layer.

14. The solid electrolytic capacitor according to claim 1, wherein said porous valve metal film contains aluminum.

15. The solid electrolytic capacitor according to claim 1, wherein said porous valve metal body contains sintered tantalum powder or sintered niobium powder.

16. The solid electrolytic capacitor according to claim 1, wherein said first and second solid electrolyte layers contain electrically conductive polymer.

17. The solid electrolytic capacitor according to claim 1, wherein said first and second sides of said package are opposite to each other about said package.

18. The solid electrolytic capacitor according to claim 1, wherein said at least one first capacitor element comprises a plurality of first capacitor elements.

19. The solid electrolytic capacitor according to claim 18, wherein two of said plurality of first capacitor elements are located at an outermost of said stacked-assembly.

20. The solid electrolytic capacitor according to claim 18, wherein said second external electrode includes a second lead frame having a portion embedded in said package from an outer surface of said package.

21. The solid electrolytic capacitor according to claim 20, wherein said portion of said second lead frame is located between two of said plurality of said first capacitor elements and said at least one second capacitor element.

22. The solid electrolytic capacitor according to claim 18, wherein said at least one second capacitor element comprises a plurality of second capacitor elements.

23. The solid electrolytic capacitor according to claim 22, wherein said stacked-assembly includes a first assembly including said plurality of first capacitor elements, and a second assembly of said plurality of second capacitor elements.

24. The solid electrolytic capacitor according to claim 22, wherein said stacked-assembly includes a plurality of first assemblies, and each of said plurality of first assemblies includes one of said plurality of first capacitor elements and one of said plurality of second capacitor elements.

25. The solid electrolytic capacitor according to claim 22, wherein said second external electrodes includes a second lead frame having a portion embedded in said package from an outer surface of said package.

26. The solid electrolytic capacitor according to claim 25, wherein said portion of said second lead frame is located between two of said plurality of first capacitor elements and said plurality of second capacitor elements.

27. The solid electrolytic capacitor according to claim 1, wherein said at least one second element comprises a plurality of second capacitor elements.

28. The solid electrolytic capacitor according to claim 27, wherein two of said plurality of second capacitor elements are located at an outermost of said stacked-assembly.

29. The solid electrolytic capacitor according to claim 27, wherein said second external electrode includes a second lead frame having a portion embedded in said package from an outer surface of said package.

30. The solid electrolytic capacitor according to claim 29, wherein said portion of said second lead frame is located between two of said at least one first capacitor element and said plurality of second capacitor elements.

* * * * *